H. F. PHILLIPS.
Hub and Axle.
No. 2,260.  Patented Sept. 18, 1841.
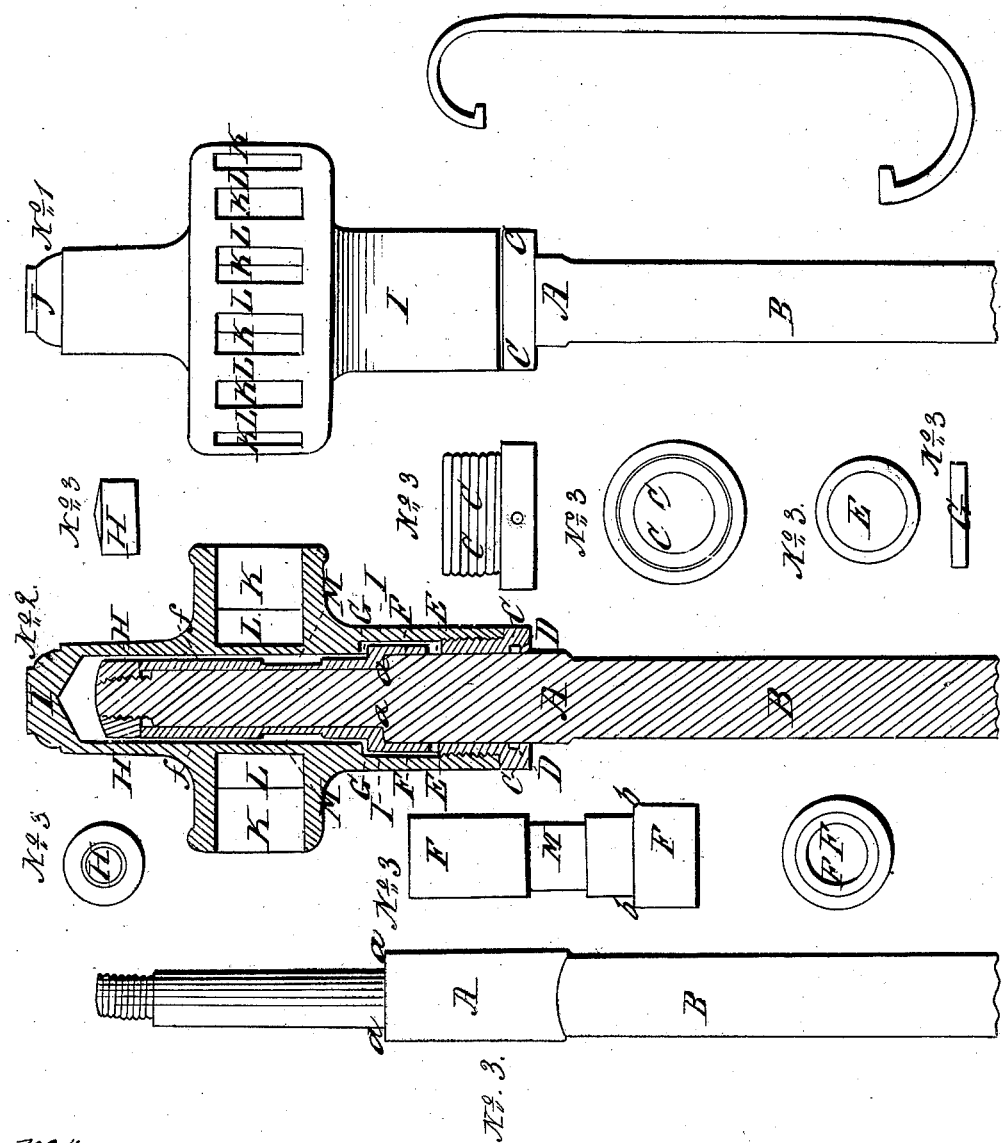
Witnesses:
M. S. Myers.
Charles W. Pomroy
Inventor:
Henry F. Phillips

UNITED STATES PATENT OFFICE.

HENRY F. PHILLIPS, OF SKANEATELES, NEW YORK.

IMPROVEMENT IN AXLES AND HUBS FOR CARRIAGE-WHEELS.

Specification forming part of Letters Patent No. 2,260, dated September 18, 1841.

*To all whom it may concern:*

Be it known that I, HENRY F. PHILLIPS, of Skaneateles, in the county of Onondaga and State of New York, have invented a new and useful Improvement in the Manner of Constructing Carriage Hubs and Axles, which I call "Phillips' Improved Carriage Hub and Axle;" and I do hereby declare that the following is a full and exact description.

I construct the hub of cast-iron, the axle of wrought-iron or steel; and my improvement consists in fitting a tube or thimble of brass or otherwise compounded metals to that part of a carriage axle-tree the most exposed to friction in such a manner as to be removed at pleasure to be replaced by a new one or to turn it upon the axle, so that the bearing may be upon other parts of its circumference, and also the manner of securing the hub on the axle by means of a screw-box in combination with the movable tube or thimble.

In the accompanying drawings, No. 1 is a representation of the hub and axle when put together. A B is the axle; I I, the hub; C C, the screw-box for fastening the hub upon the axle; K K K, mortises for spokes; L L, division between the mortises.

No. 2 is a sectional view of the hub, axle, brass (or composition) screw-box, brass (or composition) tube or thimble, and nut for fastening the tube or thimble to the axle. A B is the axle (represented separately by Drawing No. 3) turned at the end in such a manner as to form a shoulder or projection $a\ a$, No. 2, and $a\ a$, No. 3; H H, the screw-nut, which, when firmly screwed down upon the end of the thimble, presses it against the shoulder $a\ a$ and effectually secures it from either turning round or moving endwise upon the axle. F F $f\ f$ is a sectional view of the thimble, (represented separately by F F, No. 3,) and is made to fit the axle and of such length as to reach past the shoulder $a\ a$ on the axle (see E E, No. 2) and is of corresponding form, having on the outer side a shoulder or projection $b\ b$, No. 3, like that upon the axle $a\ a$, No. 3. M M is a broad shallow groove turned on the outside of the thimble, (see, also, M, No. 3,) which, when the thimble is within the hub, forms a cavity that serves as an oil-chamber or place for oil; I I I, the hub, the inner side of which is closely fitted to the outside of the thimble, and has also a shoulder on the inside (see G G, No. 2) to match that upon the outside of the thimble $b\ b$, No. 3, which in part prevents the hub from moving endwise upon the axle; K K, mortises for spokes; L L, divisions between them. C C, the screw-box, (represented separately by C C, No. 3,) is made to turn upon the axle in connection with the hub and has a screw on the outside corresponding with the one on the inside of the hub, which, when screwed into its place, meets the end of the thimble at E E, No. 2, and fully and effectually prevents the hub from slipping endwise upon the axle. D D is a groove turned on the inside of the screw-box and to be filled with packing to prevent the oil from leaking out and to protect the hub from dirt and dust from without.

Between the ends of the thimble and screw-box at E E, No. 2, and the shoulder of the hub and thimble at G G, No. 2, I introduce leather or other washers, (represented separately by E, No. 3,) which are designed to prevent wearing or friction and a rattling noise that would be occasioned if they were allowed to strike together.

The manner of putting the several parts together is as follows: Put the screw-box onto the axle and slip it past the place where it is intended to run. I then put on the washer at E E. I then put on the thimble F F $f\ f$ and fasten it securely by means of the nut H H against the shoulder $a\ a$ on the axle. I then put on another washer at G G. I then put on the hub and turn the screw-box C C into its place or until the shoulder on the screw-box is drawn tight against the end of the hub, when the whole is completed, as seen by Drawing No. 1.

What I claim as my invention, and desire to secure by Letters Patent, is—

1. The employment of a tube or thimble made of brass or composition on the arm of the axle-tree so secured that the hub revolves upon it, while it is susceptible of being turned on the axle to shift the bearing-point to some other part of its circumference, in manner substantially as herein described.

I am aware that the tube or thimble has been used on the arm of the axle-tree; but in such cases it has been permanently attached to the axle and could not be shifted, &c. Therefore I do not wish to be understood as making a claim to a thimble simply, but confine my claim, as above, to the employment of such a thimble when movable in the arm of the axle-tree.

2. The method of retaining the hub on the axle by means of the screw-box, in combination with the movable tube or thimble, as herein fully described.

HENRY F. PHILLIPS.

Witnesses:
 THOMAS Y. HOW, Jr.,
 JOSIAH SHERWOOD.